B. F. Harriman,
Cheese Press,

N° 35,820. Patented July 8, 1862.

Witnesses:

Inventor:
B. F. Harriman
per Munn & Co
attorneys

UNITED STATES PATENT OFFICE.

B. F. HARRIMAN, OF WARNER, NEW HAMPSHIRE.

IMPROVEMENT IN CHEESE-PRESSES.

Specification forming part of Letters Patent No. 35,820, dated July 8, 1862.

*To all whom it may concern:*

Be it known that I, B. F. HARRIMAN, of Warner, in the county of Merrimac, and State of New Hampshire, have invented a new and Improved Cheese-Press; and I do hereby declare that the following is a full, clear, and exact description of the same, reference being had to the accompanying drawings, forming a part of this specification, in which—

Figure 2:
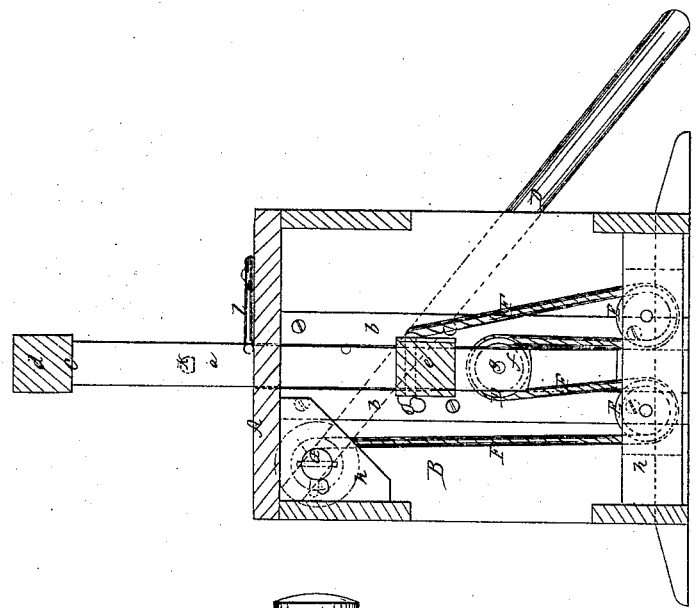
Figure 1:
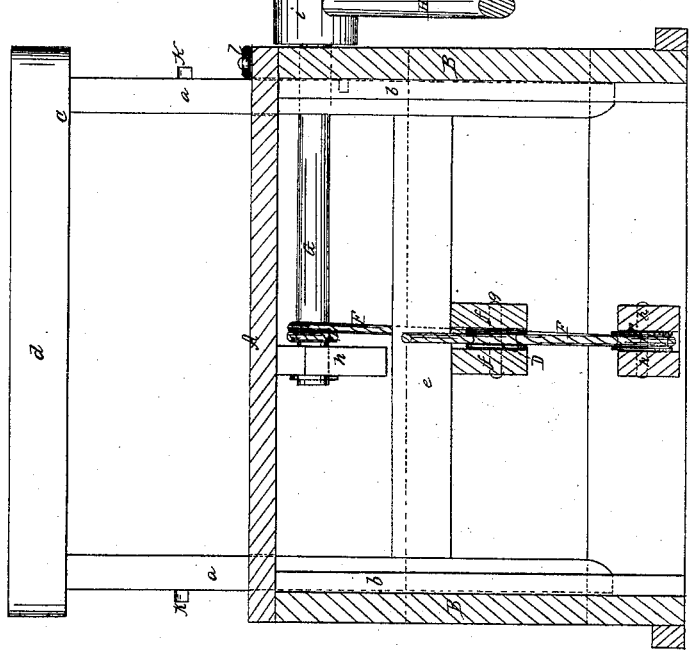

Figure 1 represents a longitudinal vertical section of my invention. Fig. 2 is a transverse vertical section of the same.

Similar letters of reference in both views indicate corresponding parts.

This invention consists in the arrangement of a series of pulleys in combination with the movable frame and with the stationary table in such a manner that one or more of said pulleys shall be attached to the center of the bottom cross-bar of the movable frame, to move up and down perpendicularly with said frame, each end of which moves precisely alike, so that the top cross-bar of said frame is always parallel to and square with the table upon which the cheese is placed, thereby securing an even downward pressure.

To enable those skilled in the art to make and use my invention, I will proceed to describe its construction and operation with reference to the drawings.

A represents the table on which the cheese to be pressed is placed. This table is made of wood or any other suitable material, and it is supported by a stout frame or legs, B.

The movable frame C moves up and down in slots in the table-top, and the uprights $a$ of said frame are guided in their up and down motion by strips $b$, of wood, which are firmly attached to the inner sides of the legs B. Said uprights are connected on the top by a cross-bar, $d$, which exerts the pressure on the cheese, and below by a cross-bar, $e$, which is parallel with the top cross-bar and with the table-top, and they are provided with studs $k$, to prevent the movable frame from sinking down below a certain point. A button or catch, $l$, retains said frame after it is raised until the cheese is put under it. From the lower cross-bar, $e$, two lugs, $f$, extend in a downward direction, which form the bearings for the axle or axles $g$ of one or more pulleys, D, and two or more pulleys, E, are placed between the cross-bars $h$, which connect the legs of the table A close down to the bottom. A rope, F, one end of which is firmly attached to the lower cross-bar, $e$, of the movable frame C, extends over the pulleys E D in the manner as clearly shown in Fig. 2 of the drawings, and its loose end is attached to and winds on a windlass, G, which is situated close under the table-top. This windlass has one of its bearings in a pendant, $h$, projecting in a downward direction from the under side of the table, and its other bearing is in one of the legs, B, through which it extends, as clearly shown in Fig. 1. Its outer end is provided with a head, $i$, which is furnished with a series of sockets, $j$, to receive a lever, H. If the windlass G is turned in the proper direction, so that the rope winds on it, the movable frame comes down with considerable force and a cheese or other article placed between it and the table is compressed. By having the pulley or pulleys D arranged under the center of the movable frame the cross-bars $d$ $e$ of said frame retain their position parallel to the table-top and an even pressure is exerted on the cheese.

It is obvious that by increasing the number of pulleys and the length of the lever H the power of the press can be increased at pleasure.

Having thus fully described my invention, what I claim as new, and desire to secure by Letters Patent, is—

The arrangement of one or more pulleys, D, under the center of the movable frame C, in combination with the pulleys E, windlass G, and with the stationary table A, constructed and operating substantially as and for the purpose shown and described.

B. F. HARRIMAN.

Witnesses:
FRANK P. HARRIMAN,
H. H. HARRIMAN.